(12) United States Patent
Vetrovec

(10) Patent No.: US 8,078,385 B2
(45) Date of Patent: Dec. 13, 2011

(54) SUPERCHARGED INTERNAL COMBUSTION ENGINE SYSTEM

(75) Inventor: Jan Vetrovec, Larkspur, CO (US)

(73) Assignee: Aqwest LLC, Larkspur, CO (US)

(*) Notice: Subject to any disclaimer, the term of this patent is extended or adjusted under 35 U.S.C. 154(b) by 421 days.

(21) Appl. No.: 12/384,860

(22) Filed: Apr. 9, 2009

(65) Prior Publication Data

US 2009/0259388 A1    Oct. 15, 2009

Related U.S. Application Data

(60) Provisional application No. 61/124,090, filed on Apr. 14, 2008.

(51) Int. Cl.
*F02D 43/00* (2006.01)
*F02B 33/00* (2006.01)

(52) U.S. Cl. ............... 701/103; 123/559.1; 123/564

(58) Field of Classification Search .............. 701/103, 701/102, 108, 109; 123/559.1, 561, 562, 123/564

See application file for complete search history.

(56) References Cited

U.S. PATENT DOCUMENTS

| 3,933,137 A | * | 1/1976 | Uno et al. | 123/564 |
| 4,196,593 A | * | 4/1980 | Froeliger | 60/612 |
| 5,839,416 A | * | 11/1998 | Kruiswyk et al. | 123/559.2 |

FOREIGN PATENT DOCUMENTS

JP      10008976 A    *    1/1998

* cited by examiner

*Primary Examiner* — Hieu T Vo

(57) ABSTRACT

A supercharged internal combustion engine system wherein during periods of high power demand the weight of combustion chamber charge is increased by cooling a portion of intake air in a turboexpander using high-pressure air from a storage tank. In addition to increasing engine output power, cold air intake also reduces engine pre-ignition (knocking) thereby reducing emissions. Mechanical energy produced during expansion of high-pressure air may be used to operate a turbocompressor, which compresses intake air and further increases charge weight. Effective supercharging is achieved even at low engine speeds. One of the objects of the invention is to obtain more power from small displacement ICE and thus providing automotive vehicles with sufficient acceleration in addition to good fuel economy. Another object of the invention is to enhance turbocharged engines and reduce their response lag. Air storage tank may be recharged using energy recovered during vehicle deceleration.

31 Claims, 5 Drawing Sheets

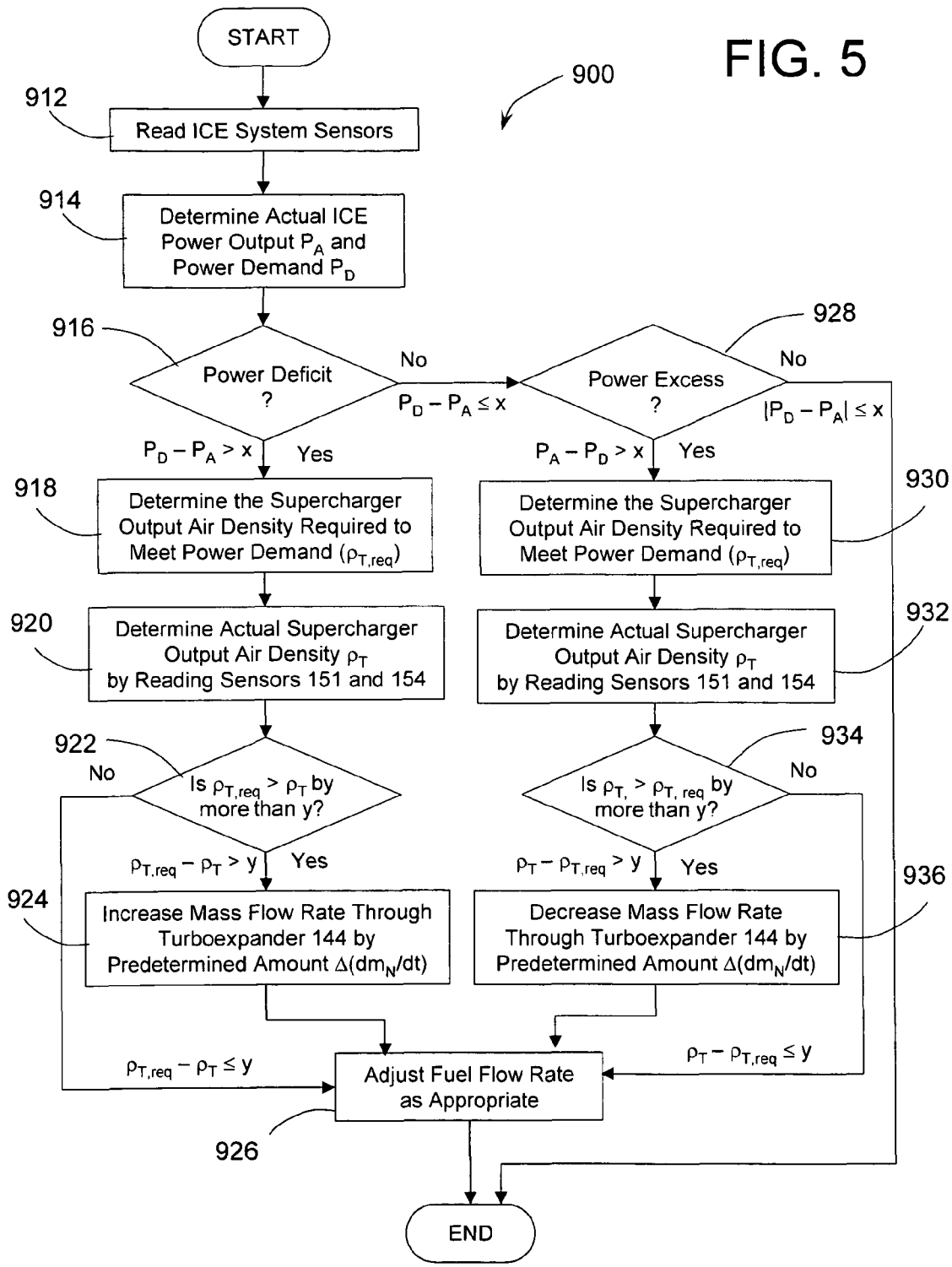

SUPERCHARGED INTERNAL COMBUSTION ENGINE SYSTEM

CROSS-REFERENCE TO RELATED APPLICATIONS

This application claims priority from U.S. provisional patent application U.S. Ser. No. 61/124,090, filed on Apr. 14, 2008.

FIELD OF THE INVENTION

This invention relates generally to supercharged internal combustion engines and, more particularly, to superchargers capable of fast response to engine demand and delivering boost independent of engine speed.

BACKGROUND OF THE INVENTION

Supercharging of Internal Combustion Engines: One of the long-term goals of the automotive manufacturers is to reduce fuel consumption and emissions of modern automotive vehicles powered by internal combustion engines (ICE) while increasing engine efficiency. One approach to reaching this goal is reducing the ICE displacement. However, downsized engines having reduced swept volume typically exhibit insufficient power and torque when operating with normal aspiration. Performance of downsized engines may be recovered by supercharging. It is well known in the art that ICE power output increases with increased weight of air ingested into engine cylinders and available for combustion. Weight of intake air ingested into engine cylinders can be increased by either (1) increasing the pressure of intake air beyond what can be accomplished by natural aspiration or by (2) reducing the temperature of intake air or by (3) a combination of (1) and (2). A supercharged ICE, therefore, receives combustion air with higher density than a naturally aspirated ICE. As a result, supercharging allows generating increased power from an engine of a given displacement or, generating a given power output from an engine of smaller size, weight, cost, and emissions. In addition, reduced charge temperature is known to reduce ICE emissions by decreasing charge pre-ignition also known as knocking.

One commonly used type of a supercharger is the exhaust-gas turbocharger which typically includes a turbine and a centrifugal compressor on a common shaft. The turbine is rotated by exhaust gases from the engine and spins the compressor. The compressor receives intake air, compresses it, and supplies it to ICE combustion chamber(s). Turbochargers provide the advantages of relatively smooth transition from natural aspiration to supercharged operation while utilizing some of the residual energy of hot exhaust gas, which would otherwise be largely wasted. The compression of intake air increases its temperature and thus undesirably limits its density. The challenges of constructing a turbocharged ICE include: 1) reducing as much as possible the response time lag and 2) reducing the temperature of air delivered to ICE. Information relevant to attempts to overcome these challenges and the disadvantages of such attempts are described below.

A turbocharged ICE is susceptible to a slow response time known as the "turbo lag" which is caused by the low pressure and low quantity of exhaust gases that are available to operate the turbine at low engine speeds. This translates to insufficient quantity of intake air delivered to the engine and results in insufficient torque at low engine speeds. The turbo-lag problem may be corrected in-part by the use of a variable nozzle turbine, which alters the cross-sectional area through which the exhaust gas flows in accordance with engine speed. However, this approach provides only a partial solution, adds complexity and cost, and reduces reliability. Another approach to reducing the turbo lag may use one or more jets of air injected onto the compressor wheel of a turbocharger as disclosed, for example, by Williams et al. in U.S. Pat. No. 3,190,068. Such air jets may be directed generally onto the vanes of the compressor wheel so as to transfer a part of their momentum to the wheel and thus accelerate the rotational speed of the compressor. Air injected in this manner becomes a part of the intake air ingested by the engine.

Recently, an electrically-assisted turbocharger (also known as the "e-turbo") has been proposed to remedy the turbo lag. Since the e-turbo makes supercharging independent of engine speed, it promises to virtually eliminate the turbo lag. Generally, in the e-turbo, electric power drawn from vehicle electric system (e.g., battery) is provided to an electric motor which spins a turbo-compressor. There are two different types of e-turbo known. The first type is formed by directly coupling an electric motor to the shaft of a conventional exhaust turbocharger, as disclosed, for example, by Kawamura in U.S. Pat. No. 4,958,497. A drawback of this approach is that during acceleration of the e-turbo to operational speed the electric motor has to overcome the compound inertia of both the turbo-compressor and the exhaust turbine while additionally being exposed to very high temperatures. The second type of e-turbo is formed by coupling an electric motor to a turbocompressor, as disclosed, for example, by Woolenberger et al., in U.S. Pat. No. 6,079,211. This type of an e-turbo can be used in series or in parallel with a conventional turbocharger to reduce the turbocharging lag and to increase torque at low ICE speeds, such as disclosed, for example, by Hoecker et al., in U.S. Pat. No. 6,889,503. However, both e-turbo approaches face the challenge of attaining the extremely fast startup and acceleration to reach operating speeds of 50,000 to 70,000 revolutions per minute (rpm) in less than one second. To meet this challenge may require ultrahigh power electronics and electric power source combined with sophisticated computer control. In particular, according to an article authored by Thomas Kattwinkel et al. entitled "Mechatronic Solution for Electronic Turbocharger" SAE paper number 2003-01-0712 published by the Society of Automotive Engineers, Inc., Warrendale, Pa., the e-turbo electric demand may not be satisfactorily met with the standard 12 volt automotive battery system.

In summary, prior art does not teach a supercharged ICE system that is effective during the conditions of high torque and low engine speed, has a fast response, is simple, economical, and can be easily retrofitted onto existing ICE, does not require exotic electric motors and power supply, avoids exposing electrical components to high temperatures, and reduces susceptibility to charge pre-ignition. Furthermore, the prior art does not teach an ICE where intake air is mixed with cold air from a turboexpander. Moreover, prior art does not teach an ICE supercharged by an a turbocompressor operated by a turboexpander expanding high-pressure air, wherein compressed intake air produced by the turbocompressor is cooled by the cold air produced by the turboexpander. It is against this background that the significant improvements and advancements of the present invention have taken place.

SUMMARY OF THE INVENTION

The present invention provides a supercharged ICE system wherein the supercharger assembly comprises a turboexpander expanding high-pressure air that supplies cold, dense air to ICE combustion chamber. Intake of dense air increases the weight of ICE charge and thus enables increase of ICE output power. The supercharger assembly may also include an ejector pump operated by cold air from the turboexpander. The nozzle pumps intake air thereby increasing its density both by compression and by cooling. The supercharger assembly may also include a turbocompressor for feeding compressed air into the ICE intake. The turbocompressor is operated by the energy extracted by the turboexpander from expanding high-pressure air. The supercharged ICE system may further include means for regulating the flow and/or pressure of high-pressure air fed to the turboexpander and thereby regulating the supercharging action. In addition, the supercharged ICE system may include means for sensing ICE power demand and appropriately controlling the operation of the turboexpander and of the turbocompressor pump (if used) to supercharge the ICE in response to demand.

Turboexpanders are well known devices in the art of cryogenics where they are used to refrigerate gas for production of cryogenic liquids. See, for example, "Turboexpanders and Process Applications," by H. P. Bloch and C. Soares, Gulf Professional Publishing of Butterworth-Heinemann, Woburn, Mass., 2001. The turboexpander comprises an expansion turbine that converts pressure energy of a gas into mechanical work as the gas expands though the turbine. More specifically, expansion of high-pressure gas in the turboexpander spins the turbine to very high rotational speeds. The gas is substantially cooled as a part of the expansion process. The turboexpansion process is nearly isentropic with the efficiency often exceeding 90%. Depending on the application, the mechanical energy generated by the turboexpander may be dumped into a brake such as a fluid brake (e.g., oil brake) or it may be used to operate a turbocompressor. Assemblies having a turboexpander and turbocompressor on the same shaft are known in the art of cryogenic refrigeration. In a turboexpander/turbocompressor, mechanical energy generated by turboexpansion of a first stream of gas is transferred from the turbine via the common shaft to a compressor wheel of the turbocompressor that compresses a second stream of gas.

In one embodiment of the present invention a supercharger assembly comprises a turboexpander expanding high-pressure air from a high-pressure air source and discharging expanded cold air stream into ICE intake passage. Cold air may be discharged through a nozzle producing a high-velocity flow which entrains intake air from other intake air sources and pumps it into ICE intake. Cold air from the turboexpander may be mixed with intake air from other sources such as ambient air, engine-driven supercharger, exhaust gas turbocharger, or electric turbocharger. The resulting intake air mixture is colder and denser. Flow of intake air from other sources may be regulated by a valve. The supercharged ICE system may also include a compressor and an air tank for providing high-pressure air to the turboexpander. The compressor may be driven by the ICE output shaft, vehicle drive train, an electric motor, or by other suitable means. Mechanical energy produced by the expansion of high-pressure air in the turboexpander may be dissipated in a brake.

In another embodiment of the invention a supercharger assembly comprises a turboexpander expanding high-pressure air and providing expanded cold air into ICE intake while also operating a turbocompressor to pump intake air into the ICE intake. Cold air from the turboexpander is mixed with the pumped (compressed) air from the turbocompressor and cools it before feeding the mixture to the ICE intake. In yet another embodiment, a bypass duct is used to reduce flow path resistance of the turbocompressor during natural ICE aspiration.

Accordingly, it is an object of the present invention to provide a supercharged ICE system capable of generating a high volume flow of intake air at high density especially during the conditions of high torque demand and relatively low engine speeds. The supercharged ICE system of the present invention is simple, lightweight, and inexpensive to manufacture which makes it suitable for large volume production of automotive vehicles.

It is another object of the invention to provide a supercharger assembly having a fast response to demand conditions.

It is yet another object of the invention to provide a supercharger assembly that is compact and easily integrable into an ICE system.

It is yet another object of the invention to provide a supercharger assembly that is simple, robust, and economical.

It is yet another object of the invention to provide a supercharger assembly that can be easily retrofitted onto existing ICE.

It is still another object of the invention to cool ICE intake air compressed by a turbocharger or an engine driven supercharger.

It is still another object of the invention to obtain more power from a small displacement ICE and thus providing automotive vehicle equipped with such an ICE with sufficient acceleration in addition to good fuel economy.

It is a further object of the invention to provide a booster stage for a conventional supercharger (engine-driven supercharger or exhaust gas turbocharger) and thus improve ICE performance at low rpm while also reducing response time.

It is still further object of the invention to provide a supercharger that can be used with hybrid vehicles to boost the power of the ICE and thus giving the hybrid vehicle more power to accelerate and ascend grade.

These and other objects of the present invention will become apparent upon a reading of the following specification and claims.

BRIEF DESCRIPTION OF THE DRAWINGS

FIG. 5 is a flow chart showing preferred control routine for operations of an electronic control unit.

DETAILED DESCRIPTION OF THE PREFERRED EMBODIMENTS

Figure 1:
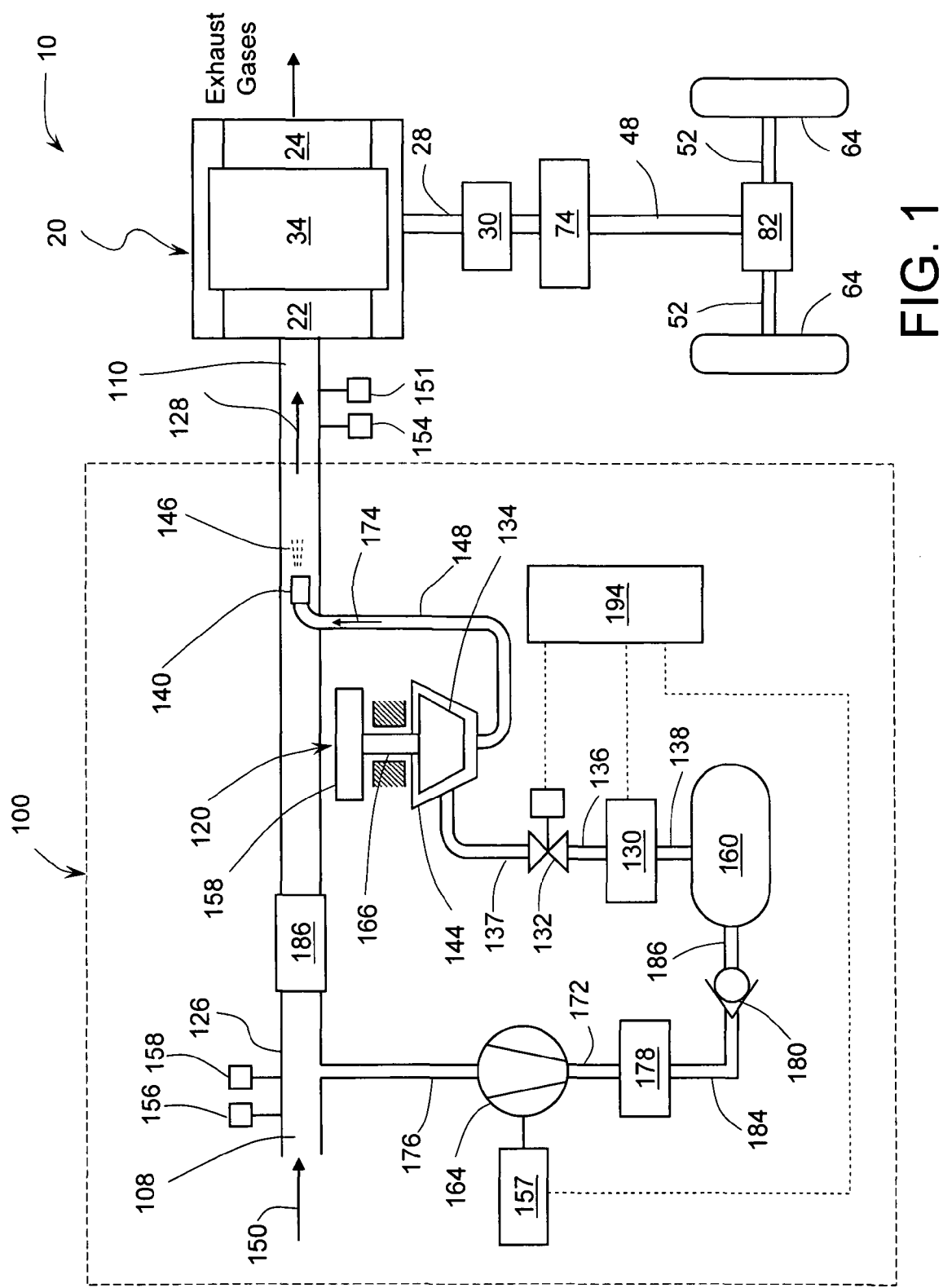
FIG. 1 is a schematic view of a supercharged ICE system in accordance with one preferred embodiment of the subject invention.

Selected embodiments of the present invention will now be explained with reference to drawings. In the drawings, identical components are provided with identical reference symbols. It will be apparent to those skilled in the art from this disclosure that the following descriptions of the embodiments of the present invention are merely exemplary in nature and are in no way intended to limit the invention, its application, or uses.

Referring to FIG. 1, there is shown a supercharged internal combustion engine (ICE) system 10 in accordance with a first embodiment of the subject invention. The ICE system 10 comprises an ICE 20 and a supercharger assembly 100. The ICE 20 has at least one combustion chamber 34 fluidly coupled to an intake passage 22 and to an exhaust passage 24. The type of ICE 20 can be either a compression ignition (diesel), a fuel injected spark ignition, carbureted spark ignition, or homogeneous charge compression ignition (HCCI) also known as controlled auto-ignition (CAI). Furthermore, the ICE 20 may also include an output shaft 28 and a torque sensor 30 for sensing ICE output torque. When the ICE system 10 is installed in an automotive vehicle, the output shaft 28 may provide power to a transmission 74, which in turn, may spin a drive shaft 48 to operate vehicle wheels 64 via differential 82 and axle 52 as is commonly practiced in the art. The supercharger assembly 100 may comprise an intake duct 126, a turboexpander assembly 120, a high-pressure air supply line 138, control valve 132, pressure regulator 130, interconnecting lines 136 and 137, and air feed line 148. In addition, the supercharger assembly 100 may also include a compressor 164, compressor inlet line 176, aftercooler 178, check valve 180, air tank 160, and interconnecting lines 172, 176, 184, and 186.

The intake duct 126 has an upstream end 108 fluidly connected to a source of intake air and a downstream end 110 fluidly connected to the intake passage 22. Suitable sources of intake air include 1) atmospheric air which may be provided at near ambient pressure and 2) output air from a supercharger (such as engine-driven supercharger, exhaust gas turbocharger, or an electric turbocharger) which may be preferably provided at a pressure higher than ambient atmospheric pressure. The upstream end 108 may be equipped with a pressure sensor 156 and a temperature sensor 158. The downstream end 110 may be equipped with a pressure sensor 154 and a temperature sensor 151. The intake duct 126 may also include a valve 168 to regulate air flow therethrough. The valve 168 may be installed upstream of the location where the air feed line 148 is fluidly connected to the intake air duct 126. Suitable valve 168 includes an automatic check valve permitting a intake air flow from the upstream end 108 to the downstream end 110 of duct 126 but restricting the flow in the opposite direction. An example of such an automatic check valve may be a flapper style check valve. Another suitable valve 168 may be an actuated valve, which in an open position offers low resistance to intake air flow. Such a valve may be a butterfly-type valve. A suitable actuator may be a stepping motor, which allows precise control over valve position.

The compressor 164 can be of any suitable type including piston, vane, scroll, diaphragm, and screw type (also known as Lysholm) and it may have one or more stages to obtain a desired level of compression. Suction port of the compressor 164 is fluidly coupled by the inlet line 176 to the intake duct 126 and it is adapted for drawing a portion of intake air therefrom. The compressor 164 is preferably driven mechanically, hydraulically or by other suitable means from the output shaft 28 of the ICE 20 or from the vehicle drive shaft 48. Suitable mechanical means may include 1) direct coupling and/or 2) a system of belt and pulleys. Suitable mechanical means may comprise a clutch 157 that allows engaging the compressor 164 in accordance with predetermined conditions as it will be described below. Clutch 157 may be controlled mechanically, electrically, pneumatically, hydraulically, or by other suitable means. Preferably, the drive of the compressor 164 has a variable speed capability to allow the compressor 164 to operate at a controlled speed and substantially independent from the speed of the output shaft 28 and the drive shaft 48. This approach allows the compressor 164 to deliver large quantities of air even the output shaft 28 and the drive shaft 48 operate at low speeds. The compressor 164 may be engaged, for example, during vehicle deceleration to a stop and recover a significant portion of vehicle's kinetic energy event at relatively slow vehicle motion. For example, suitable hydraulic means may drive the compressor 164 from the vehicle drive shaft 48 using a hydraulic pump and motor assembly with variable speed capability. Alternatively, the compressor 164 may be driven by an electric motor. Discharge port of the compressor 164 is fluidly coupled to the air tank 160 via the aftercooler 178, check valve 180 and interconnecting lines 172, 184 and 186.

The aftercooler 178 may be of the same general type used in conventional compressed air systems to remove the heat of compression from the air downstream of a compressor. The aftercooler 178 may be cooled by ambient air or by ICE coolant or other suitable means. The check valve 180 prevents a backflow of high-pressure air from the air tank 160 into the compressor 164 when the compressor is not operating. Line 184 may also include a water separator to remove water condensate from cooled air flow. The design and the choice of materials for the air tank 160 are preferably selected to reduce the likelihood of tank rupture in case of vehicle collision and/or fire. In this respect a plurality of smaller interconnected tanks may be preferable to a single large tank. The air tank 160 may also include a pressure sensor and a temperature sensor that may be used together to determine the amount of air stored. In addition, the air tank 160 may contain an automatic drain valve for automatic expulsion of water condensate that has formed inside the tank.

The pressure regulator 130 is fluidly connected to the air tank 160 by means of the high-pressure line 138. Preferably, the pressure regulator 130 is remotely controllable in a manner that allows remotely controlling the pressure level in line 137. Suitable pressure regulators that are remotely controllable either electrically, pneumatically, hydraulically, or mechanically have been disclosed in prior art and are available commercially. The control valve 132 is fluidly connected to the pressure regulator 130 by means of line 136 and to the inlet port of the turboexpander 144 of the turboexpander assembly 120 by means of line 137. The control valve 132 may be of on/off type preferably having a very low flow impedance. Alternatively, the control valve 132 may be adapted for substantially smooth regulation of flow of high-pressure air in which case the pressure regulator 130 may become unnecessary.

The turboexpander assembly 120 comprises a turboexpander 144 and a brake 158. The turboexpander 144 includes a turbine wheel 134. The turbine wheel 134 and the brake 158 are mounted on a common shaft 166. The inlet port of turboexpander 144 is fluidly connected to the air tank 160 via pressure regulator 130, valve 132, and interconnecting lines 136, 137, and 138. The outlet port of the turboexpander 144 is fluidly connected to the air feed line 148 which is terminated inside the intake duct 126 with a nozzle 140. The nozzle 140 is oriented toward the downstream end 110 of the duct 126. The purpose of the nozzle is to direct cold air generated by the turboexpander assembly 120 generally in the direction of the downstream end 110 of the intake duct 126. One nozzle or several nozzles working in parallel may be used. Suitable nozzle types include a simple orifice, a subsonic nozzle, a sonic nozzle, supersonic nozzle, converging-diverging nozzle, and a lobed nozzle. Lobed nozzles are known to have improved characteristics for mixing of the surrounding air with the high velocity jet the produce. An engine throttle, if used, may be located in the intake duct 126.

The ICE system 10 preferably includes an electronic control unit (ECU) 194. Suitable ECU may comprise a central processing unit, a read-only memory, random access memory, input and output ports, and the like. The ECU 194 may be configured to receive signals from sensors in the ICE system 10, to determine whether certain predetermined conditions exist based on the measured parameters.

During normal operation of the supercharged ICE system 10, the compressor 164 is caused to maintain air pressure in tank 160 within predetermined limits. In particular, the compressor 164 draws air (preferably free of dust and solid particulates) from the intake duct 126 through the inlet line 176 and compresses it to a desired pressure. Preferred compressor output pressure is between 100 and 300 psi. As an alternative, the compressor 164 may draw filtered air from ambient atmosphere. Output of the compressor 164 is fed through line 172 into the aftercooler 178 where the heat of compression is largely removed, and through line 184, check valve 180 and line 186 into the tank 160. The air tank 160 may be equipped with a pressure switch having one higher setting and one lower setting. The pressure switch may be wired to the controls of the compressor 164 (and/or to the clutch 157, if used) so that the compressor 164 maintains the pressure in the air tank 160 between predetermined limits. Alternatively, the compressor 164 may be equipped with an unloader valve which automatically relieves the compressor of the pumping load when air tank 160 is charged to a predetermined pressure value. Preferably, the compressor 164 is engaged in a smooth and/or gradual manner to avoid imposing abrupt load on its source of motive power. In particular, to avoid excessive power drain on the ICE or the vehicle power train, operation of the compressor may be prohibited or restricted during periods of high power demand. Alternatively, operation of the compressor may be allowed only when the ICE output torque is less than a predetermined ICE output torque value. If the compressor 164 is operated from the output shaft 28 or the vehicle drive shaft 48, operation of the compressor 164 may be allowed only when the torque in the output shaft 28 or the vehicle drive shaft 48 is less than a predetermined shaft torque value. If the compressor 164 is operated from the output shaft 28 or the vehicle drive shaft 48 using a variable speed drive, such a variable speed drive is preferably arranged to operate the compressor 164 at a speed substantially independent of the speed of the output shaft 28 or the vehicle drive shaft 48. In particular, constant speed of compressor 164 is preferably maintained during at least a portion of time during which the vehicle decelerates. This approach permits efficient use of vehicle's kinetic energy to operate the compressor 164.

When the ICE 20 operates without the aid of the supercharger 100, the control valve 132 is closed. Intake air stream 150 preferably free of dust and solid particulates may enter the upstream end 108 of intake duct 126 and it may exit through the downstream end 110 into the intake passage 22 of ICE 10 without a significant temperature change. The compressor 164 may be operated concurrently, as necessary to maintain pressure inside the tank 160 within predetermined limits.

When the ICE 20 operates with the aid of the supercharger 100, the pressure regulator 130 regulates high-pressure air it receives from the high-pressure supply line 138 and flows regulated high-pressure air at a predetermined pressure into the line 136. The valve 132 and the lines 136, 137, and 148 are preferably constructed to have a very low impedance to air flow. The control valve 132 is in an open position and allows the high-pressure air to flow through the line 137 to the inlet port of the turboexpander 144. The high-pressure expends in the turboexpander 144, spins the turbine wheel 134, and cools down. Mechanical work extracted in the expansion process is transmitted from the turbine wheel 134 by the common shaft 166 to the brake 158. The brake 158 may dissipate supplied work into suitable gas or liquid medium. Cold air exits the turboexpander 144 and it forms a cold air stream 174. The cold air stream 174 is transported through the air feed line 148 to the nozzle 140 and it emerges therefrom as a stream 146. Concurrently, intake air stream 150 preferably free of dust and particulates enters the upstream end 108 of duct 126, it mixes with the stream 146, thereby producing a mixed engine feed stream 128. As a result, air density at the downstream end 110 of duct 126 is greater than air density at the upstream end 108, and the air temperature at the at the downstream end 110 is lower than at the upstream end 108. This means that the air density of the engine feed stream 128 is significantly greater than the density of the intake air stream 150. The mass flow rate of intake air flowing the intake passage is thus significantly increased, thereby enabling the ICE to produce more power. This a potential for producing more power be utilized by concurrently increasing the fuel flow rate to an appropriate level.

If the valve 168 is installed in the intake duct 126, it may be used to regulate the flow of the intake air stream 150. For example, the valve 168 may be in a closed position when the mass flow rate of high-pressure air fed to the inlet of turboexpander 144 exceeds a predetermined mass flow rate value. When the valve 168 may be in a closed position, all of the intake air for the ICE is provided by the turboexpander assembly 120. In particular, the output flow of the turboexpander assembly 120 may be increased to boost the pressure in the intake passage 22 to a level beyond what may be possible with the valve 168 in an open position (or with the valve 168 not installed). This may yield a double benefit of supplying the ICE with intake air that is both cold air and at elevated pressure. If the valve 168 is employed to regulate the intake air flow, the rates of closing and opening the valve are preferably controlled so that the density of intake air in intake passage 22 is varied substantially smoothly and sudden surges or drops in ICE output power are avoided. It should be noted that the intake air stream 150 may originate from intake air sources including ambient atmosphere or a discharge flow from a supercharger. The latter may be an engine driven supercharger, a turbocharger, or electric turbocharger. Injection of cold air stream 174 into an output of such a supercharger may reduce the need for an intercooler which is normally used downstream of a supercharger.

Under typical driving conditions the periods of high-power demand are relatively short and (depending on vehicle driving conditions) may occur on the average only about 10% of the vehicle operating time. This means that the supercharger 100 may operate in an intermittent mode, supercharging the ICE for about 10% of the vehicle operating time. This may leave on the average about 90% of the vehicle operating time available for recharging the supercharger tank 160.

At any time during the ICE operation, the ECU 194 may monitor one or more operating parameters of the ICE system 10 and regulates the mass flow rate of air through the vortex tube 120 by operatively controlling the pressure regulator 130 and the valve 132 according to predetermined conditions. Operating parameters monitored by the ECU may include engine rotational speed, engine output torque, fuel flow rate, vehicle speed, throttle opening, and position of accelerator pedal. Other useful parameters monitored by the ECU may include ambient air pressure and temperature, intake air mass flow rate, intake air pressure and temperature, detection values of pressure sensors 154 and 156, and detection values of temperature sensors 151 and 158. The torque value can be either directly measured (for example, the torque value can be the detection value from the torque sensor 30) or it can be inferred from other ICE parameters. In particular, it is well known that engine torque value can be estimated from one or more ICE parameters including intake air mass flow rate, spark timing, or combustion chamber pressure data as noted, for example, by T. Jaine et al. in "High-Frequency IMEP Estimation and Filtering for Torque-Based SI Engine Controls," SAE paper number 2002-01-1276, published by the Society of Automotive Engineers, Inc., Warrendale, Pa. Alternatively to using an ECU with a central processing unit, various electrical, mechanical, electromechanical, hydraulic, and/or pneumatic control mechanisms may be used to operate the valve 132 and the pressure regulator 130 in response to predetermined conditions. It will be apparent to those skilled in the art from this disclosure that the precise structure and algorithms for the ECU can be any combination of hardware and software that will carry out the functions of the present invention.

Figure 2:
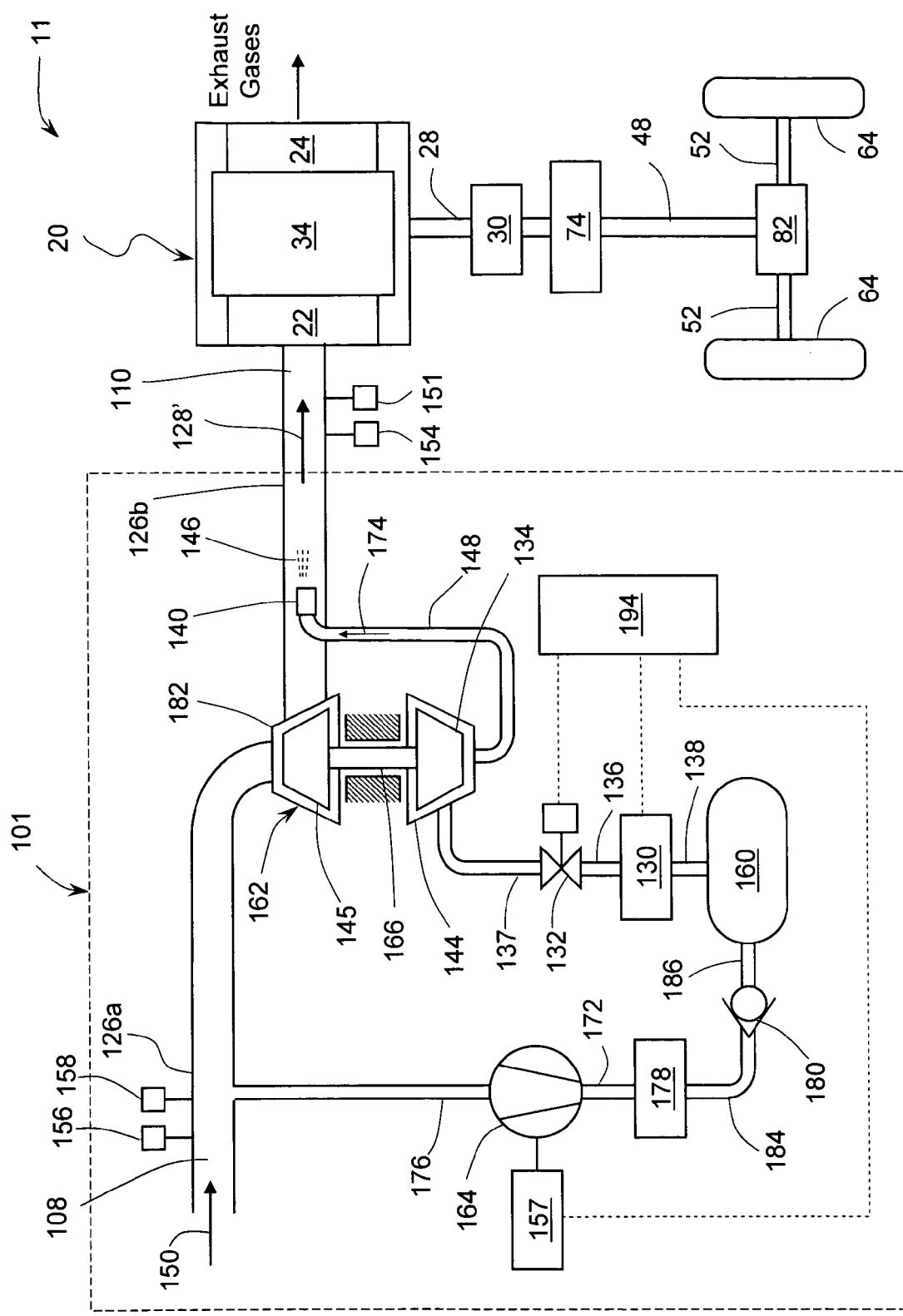
FIG. 2 is a schematic view of a supercharged ICE system in accordance with another preferred embodiment of the subject invention.

Referring now to FIG. 2, there is shown a supercharged ICE system 11 in accordance with another embodiment of the subject invention and having enhanced capability to provide dense air to the ICE 20. The ICE system 11 comprises a supercharger assembly 101 which is similar to the supercharger assembly 100 except that the brake 158 in the supercharger assembly 100 is replaced by a turbocompressor 182 in the supercharger assembly 101. The turbocompressor 182 is preferably of the radial type frequently used in turbochargers and it includes a compressor wheel 145 is mounted on a common shaft 166 with the turbine wheel 134 of turboexpander 144. In particular, the turboexpander 144, turbocompressor 182, and the shaft 166 for a turboexpander/turbocompressor assembly 162. The inlet of the turbocompressor 182 is fluidly connected to the intake duct 126a and arranged to receive intake air therethrough. The outlet of the turbocompressor 182 is fluidly connected via intake duct 126b to the intake passage 22 of the ICE 20. Note that while the general configuration of the turboexpander/turbocompressor assembly 162 is similar to that of commonly used turbocharger, there are significant difference in its design and construction. In particular, the turboexpander/turbocompressor assembly 162 operates at near ambient or at subambient temperatures, which permits the use of common materials for construction. For example, the turbine wheel 134, the compressor wheel 145, and the housings of the turboexpander 144 and the turbocompressor 182 may be made of aluminum, graphite epoxy, fiberglass epoxy, or plastics. In addition, low friction bearings such magnetic bearing may be used to suspend the shaft 166, which allows for a quick response to acceleration demands. This is in a sharp contrast to a turbocharger that is exposed to the high temperature exhaust gases, which in turn necessitates the use of exotic, costly, and difficult-to-machine high-temperature materials.

The operation of the supercharged ICE system 11 is similar to that of the supercharged ICE system 10 except that the intake air provided to the ICE 20 is also compressed to a higher pressure. In particular, when the ICE 20 operates with the aid of the supercharger 101, high-pressure air flows through the line 137 into the turboexpander 144, expands therein, spins the turbine wheel 134, and cools down. Cold expanded air exits the turboexpander 144 and it forms a cold air stream 174. The cold air stream 174 is transported through the air feed line 148 to the nozzle 140 and it emerges therefrom as a stream 146 inside the intake duct 126b. Mechanical work generated by the turboexpander 144 from the expansion process is transmitted from the turbine wheel 134 by the common shaft 166 to the compressor wheel 145 of the turbocompressor 182 and spins it. Intake air stream 150 is drawn through the intake duct 126a into the turbocompressor 182, is compressed therein, and fed into the intake duct 126b where it is mixed with the stream 146, thereby producing a mixed engine feed stream 128'. Intake air may be significantly heated by the compression in the turbocompressor 182. Hot compressed air provided by the turbocompressor 182 into the intake duct 126b is at least in part cooled by mixing with the stream 146 of cold air fed into the intake duct 126b from the turboexpander 144. As a result, the net increase in temperature (if any) of intake air flowing through supercharger assembly 101 is very limited. This means that the supercharger assembly 101 may provide compressed intake air to the ICE 20 without a need for an intercooler. In particular, depending on the operating conditions of the supercharger assembly 101, the temperature of the engine feed stream 128' may be lower than, about same as, or higher than the temperature of the intake air stream 150. Controllability over intake air temperature may be beneficial if the ICE 20 operates in the homogeneous charge compression ignition (HCCI) mode.

Figure 3:
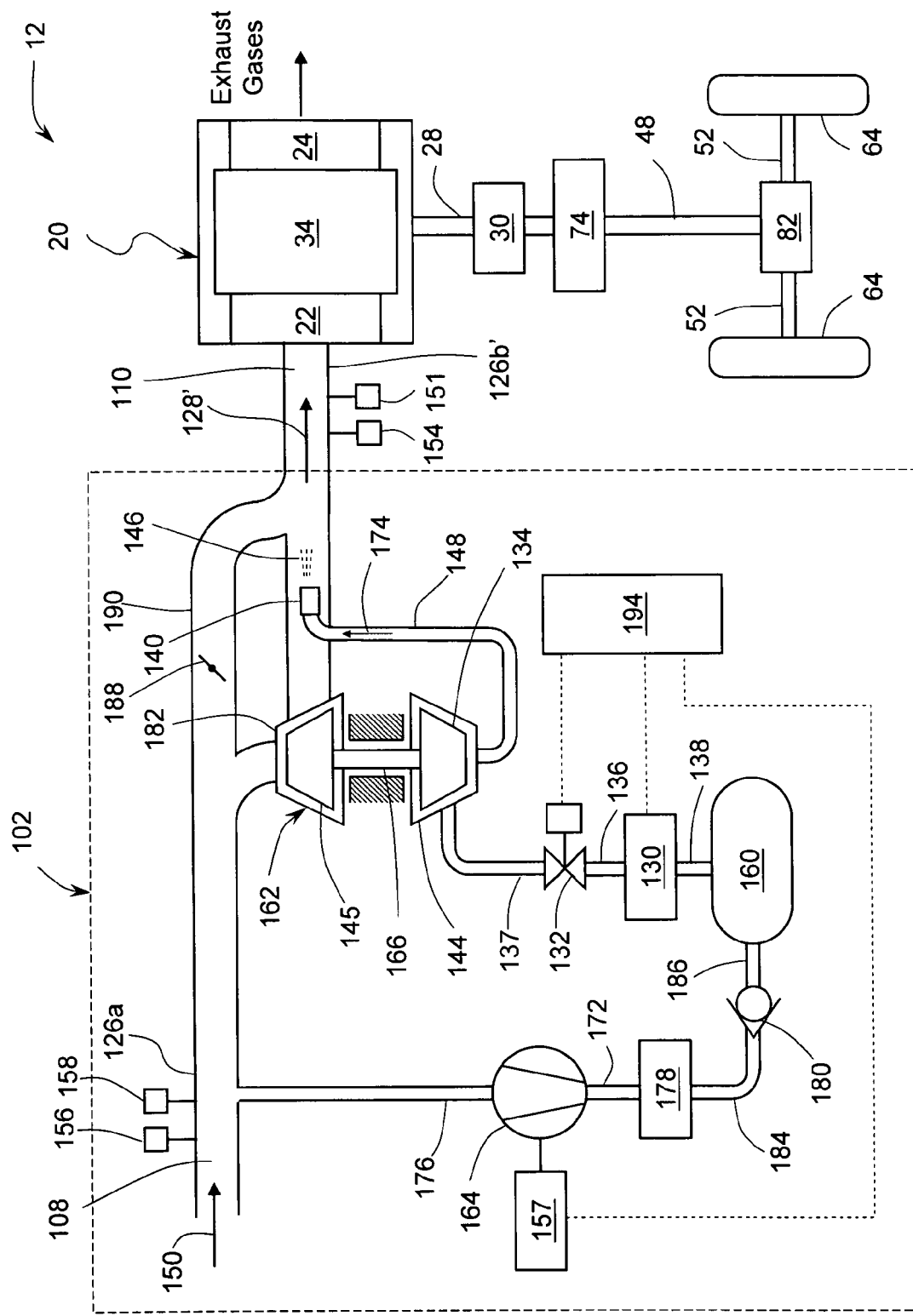
FIG. 3 is a schematic view of a supercharged ICE system in accordance with yet another preferred embodiment of the subject invention.

Referring now to FIG. 3, there is shown a supercharged ICE system 12 in accordance with another embodiment of the subject invention and having reduced intake flow path resistance during natural aspiration of the ICE 20. The ICE system 12 comprises a supercharger assembly 102, which is similar to the supercharger assembly 101 except that it further includes a bypass duct 190 that fluidly connects the inlet and outlet of the turbocompressor 182. The bypass duct 190 further includes a bypass valve 188 intended to prevent a back flow through the bypass duct. The bypass valve 188 may be formed as a check valve that closes automatically whenever the pressure at the downstream end 110 of the intake duct 126b' exceeds the pressure at the upstream end 108 of the intake duct 126a' by more than a predetermined pressure amount. Alternatively, the bypass valve 188 may an actuated valve of a suitable type (e.g., gate valve, poppet valve, damper valve, or a butterfly valve) operated by the ECU 194. For example, the ECU 194 may close the bypass valve 188 whenever the speed of the turbocompressor 182 exceeds a predetermined speed value. Conversely, the ECU 194 may open the bypass valve 188 whenever the speed of the turbocompressor 182 is below a predetermined speed value. As another example, the bypass valve 188 may be arranged to be closed when the mass flow rate of high-pressure air fed into the inlet port of the turboexpander 144 is more than a predetermined mass flow rate value and to be open when the mass flow rate is less than a predetermined mass flow rate value. If the valve 188 is an actuated valve, its closing and opening rate may be coordinated with the speed of the turbocompressor 182 to produce a substantially smooth variation in air density at the ICE intake passage 22. This approach avoids undesirably abrupt changes in supercharger output air density and consequential abrupt changes in ICE power output. Suitably accurate control of valve 188 can be accomplished, for example, by actuating the valve 188 by a stepping motor.

During a naturally aspirated operation of the ICE 20, the bypass valve 188 is in an open position and the control valve 132 is closed. The ICE draws the intake air stream 150 through the intake duct 126a' and through the bypass duct 190 into the ICE intake passage 22. Some portion of the intake air may also flow through the turbocompressor 182. When the ICE 20 is supercharged by the supercharger assembly 102, the bypass valve 188 is closed, the control valve 132 is open and the turboexpander/turbocompressor assembly 162 is operated.

Figure 4:
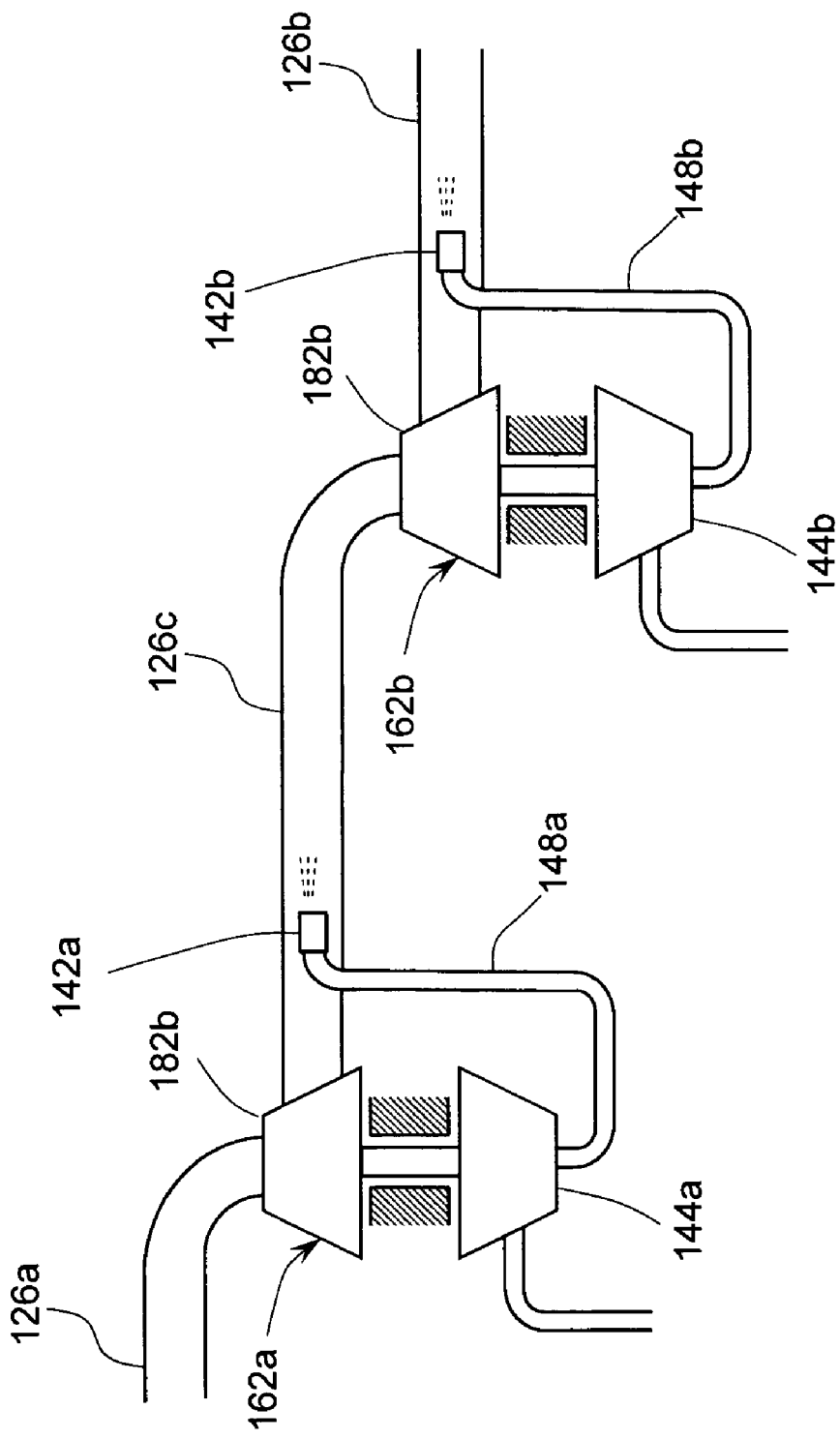
FIG. 4 is a schematic view of a two-stage configuration of the turboexpander/turbocharger assemblies.

A compression ratio achievable in a single stage turbocompressor is typically less than 1.8. To obtain a higher compression ratio, several turbocompressors 182 may be staged in series. FIG. 4 shows two turboexpander/turbocompressor assemblies 162b and 162b connected in series. In particular, the inlet of the turbocompressor 182a may be fluidly connected to a source of intake air via the intake duct 126a, and the outlet of the turbocompressor 182b may be fluidly coupled to an ICE intake via the intake duct 126b. The outlet of the turbocompressor 182a is fluidly connected to the inlet of the turbocompressor 182a via a coupling duct 126c. The inlets 137a and 137b of turboexpanders 144a and 144b respectively may be connected to either common or separate sources of high-pressure air. The outlet of turboexpanders 144a may be fluidly connected to the coupling duct 126c. The outlet of turboexpanders 144b may be fluidly connected to the intake duct 126b. In operation, flow of high-pressure air into turboexpanders 144a and 144b may be controlled by either a common valve 132 and pressure regulator 130, or by separate valves and pressure regulator.

There is a variety of processes the ECU 194 may employ for controlling the operation of the supercharger 100. Preferably, the ECU repeatedly executes the control routine 900 represented by the flowchart shown in FIG. 5. After the control routine 900 is started and the ECU obtains detection values of various ICE system sensors to determine ICE state (step 912). Such sensors may include, but are not limited to ICE rotational speed, position of accelerator pedal, throttle opening, fuel flow rate, vehicle speed, ICE output torque, air velocity in the intake duct 126, air pressure in line 137, setting of the pressure regulator 130, position of the control valve 132, position of the valve 168 (if used), position of the bypass valve 188 (if used), rotational speed of the turboexpander 144, detection values of pressure sensors 154 and 156, detection values of temperature sensors 151 and 158, air pressure and temperature in ICE intake passage 22, and ambient air pressure, temperature, and humidity. Preferably, the ECU calculates the actual ICE power output ($P_A$) and the power output being demanded from the ICE ($P_D$) (step 914). Based on the obtained parameters the ECU may determine whether or not an ICE power deficit exists (step 916). This may be accomplished, for example, by comparing the values of the actual ICE power output $P_A$ and the demanded ICE power output (power demand) $P_D$. A power deficit may be established when, for example, the power demand $P_D$ is greater than the actual ICE power output $P_A$ by more than a predetermined amount x (namely, $P_D - P_A > x$).

If a power deficit exists, the ECU may then calculate the air density ($\rho_{T,req}$) at the downstream end 110 of the intake duct 126 (supercharger output air density) required to meet the power demand at optimum throttle opening (if throttle is used) and air-fuel ratio (step 918). If the ICE has an electronically controlled throttle, an optional next step (not shown) can include opening of the throttle by a predetermined amount. The ECU 194 then obtains actual intake air density measurement ($\rho_T$) by obtaining the detection value of the pressure sensor 154 and temperature sensor 151 (step 920). The values of the required air density $\rho_{T,req}$ and the actual air density $\rho_T$ are then compared (step 922). If the required density value $\rho_{T,req}$ is greater than the actual density value $\rho_T$ by more than a predetermined amount y (namely, $\rho_{T,req} - \rho_T > y$), the ECU increases the mass flow rate $dm_N/dt$ of high-pressure air into the turboexpander 144 by a predetermined incremental amount $\Delta(dm_N/dt)$ (step 924). This may be accomplished by increasing the output pressure of the pressure regulator 130 with the valve 132 in open position. The value of incremental amount $\Delta(dm_N/dt)$ may be made generally proportional to the difference between the required and actual air densities at the downstream end 110 of the intake duct 126 (namely, $\Delta(dm_N/dt) \propto \rho_{T,req} - \rho_T$). If desired, the incremental amount $\Delta(dm_N/dt)$ can be appropriately limited not to exceed a predetermined value, and such a value can be updated each time the routine of FIG. 4 is executed. This approach can be used to avoid abrupt changes in supercharger output pressure and consequential surge in ICE output. Preferably, an increase in the supercharging action is performed so that ICE power is increased in a smooth fashion and with prompt response to demand. To assure proper air-fuel ratio, ECU may adjust fuel flow rate as appropriate to improve ICE performance (step 926) and the routine is ended. If the required density value $\rho_{T,req}$ is not greater than the actual density value $\rho_T$ by more than a predetermined amount y (namely, $\rho_{T,req} - \rho_T \leq y$) (step 922), no change to the supercharger condition is required. Then the ECU may adjust fuel flow rate as appropriate for improved ICE performance (step 926) and the routine is ended.

If the ECU determines that a power deficit does not exist (step 916), the ECU may then evaluate whether a power excess exists (step 928). A power excess may be established when, for example, the demand power output $P_D$ is smaller than the actual ICE power output $P_A$ by more than a predetermined amount x (namely, $P_A - P_D > x$). If a power excess exists, the ECU may then calculate the air density $\rho_{T,req}$ at the downstream end 110 of the intake duct 126 required to meet the power demand at optimum throttle opening (if throttle is used) and air-fuel ratio (step 930). If the ICE has an electronically controlled throttle, an optional next step (not shown) can include closing of the throttle by a predetermined amount. The ECU then obtains actual supercharger output air density measurement $\rho_T$ by obtaining the detection values of the pressure sensor 154 and temperature sensor 151 (step 932). The values of the required pressure $\rho_{T,req}$ and the actual air density $\rho_T$ at the downstream end 110 of the intake duct 126 are then compared (step 934). If the required density value $\rho_{T,req}$ is smaller than the actual density value $\rho_T$ by more than a predetermined amount y (namely, $\rho_T - \rho_{T,req} > y$), the ECU may decrease the mass flow rate $dm_N/dt$ of high-pressure air into the turboexpander 144 by a predetermined incremental amount $\Delta(dm_N/dt)$ (step 936). This may be accomplished by decreasing the output pressure of the pressure regulator 130 with the valve 132 in an open position or by closing the valve 132. The value of incremental amount $\Delta(dm_N/dt)$ can be made generally proportional to the difference between the actual and the required densities in the intake duct 126, namely $\Delta(dm_N/dt) \propto \rho_T - \rho_{T,req}$. If desired, the incremental amount $\Delta(dm_N/dt)$ can be appropriately limited not to exceed a predetermined value which can be updated each time the control routine 900 is executed. This approach may be used to avoid abrupt changes in air density in the intake passage 22 and the consequential abrupt change in the ICE output. Preferably, a reduction in supercharging action is performed so that ICE power is decreased in a smooth fashion and with prompt response to demand. To assure proper air-fuel ratio, ECU can adjust fuel flow rate as appropriate to improve ICE performance (step 926) and the routine is ended. If the actual air density value $\rho_T$ is not greater than the required air density value $\rho_{T,req}$ in the transition duct by more than a predetermined amount y (namely, $\rho_T - \rho_{T,req} \leq y$) (step 922), no change to the supercharger condition is required. Then, the ECU can adjust fuel flow rate as appropriate for improved ICE performance (step 926) and the routine is ended.

If the routine step 928 establishes that value of $P_D-P_A$ is less than or equal to predetermined value x, it means that the absolute value of $P_D-P_A$ is less than or equal to predetermined value x (namely, $|P_D-P_A| \leq x$). In such a case, neither power deficit or power excess exist and the routine is ended. This conditions may correspond to an automotive vehicle cruising on a level road or an ICE operating in idle. To ensure that ICE system 10 promptly responds to demand, the control routine 900 may be executed at a rapid repetition rate, preferably 10 to 100 times per second. An analogous routine may be also used to control the superchargers 101 and 102 if the ICE systems 11 and 12, respectively.

Alternative control routine responding to torque demand rather than power demand may be also implemented. Such a routine may be identical to the routine 900 except that in steps 914, 916, and 928, the term "power" is replaced with the term "torque". Suitable methods for determining demand torque value are known in the art and include determination of demand torque from position of vehicle acceleration pedal. See, for example, N. Heintz et al., in "An Approach to Torque-Based Engine Management Systems," SAE paper number 2001-01-0269, published by the already noted Society of Automotive Engineers. Another alternative control routine may be used if the ICE system has means for measuring intake air mass flow. Such a routine may be identical to the routine 900 except that in steps 918, 920, 922, 930, 932 and 934, the terms "$\rho_{T,req}$" and "$\rho_T$" are replaced respectively with the terms "$dm_{T,req}/dt$" and "$dm_T/dt$" where $dm_{T,req}/dt$ is the mass flow of air required to meet ICE output demand and $dm_T/dt$ is the actual mass flow of air measured flowing through the transition duct 124. Another variant of the control routine 900 may omit steps 918, 920, 922, 930, 932, and 934.

Alternative criteria for establishing power deficit and power excess conditions include: 1) Power deficit condition is established when engine rotational speed is less than predetermined engine rotational speed value and engine output torque is more than a predetermined engine output torque value. Accordingly, power excess condition is established when engine rotational speed is more than predetermined engine rotational speed value and engine output torque is less than a predetermined engine output torque value. 2) Power deficit condition is established when engine rotational speed is less than predetermined engine rotational speed value and engine fuel flow rate is more than a predetermined fuel flow rate value. Accordingly, power excess condition is established when engine rotational speed is more than predetermined engine rotational speed value and engine fuel flow rate is less than a predetermined fuel flow rate value. 3) Power deficit condition is established when the actual engine torque (measured or inferred) value is less than the demand torque value calculated from the position of accelerator pedal. Accordingly, power excess condition is established when the actual engine torque (measured or inferred) value is more than the demand torque value calculated from the position of accelerator pedal.

It will be appreciated that the present invention can be implemented with a variety of ICE of either reciprocating type or rotary type. The ICE can have any number of combustion chambers. Features of the various embodiments can be combined in any manner. As already noted, the supercharger assembly 100 (and each of its embodiments 101 and 102) be also used with engine-driven superchargers, exhaust gas turbochargers, and electric turbochargers to augment their performance. One advantage of using the invention in a combination with an engine driven supercharger or a turbocharger is that the performance of the overall ICE system is improved since the supercharger assembly of the subject invention provides improved supercharging performance in conditions of high torque and low engine speeds (e.g., during automotive vehicle acceleration from a stopped condition), whereas the conventional supercharger provides improved supercharging performance in conditions of high torque and high engine speeds, especially when such conditions last for a longer period of time (e.g., during extended grade ascent or passing).

When the invention is used to supercharge ICE in vehicles such as trucks, busses, earth moving equipment, and utility vehicles that already have an existing supply of high-pressure air, such an existing supply may be used to feed high-pressure air into the turboexpander 144. High-pressure air for operation of the turboexpander 144 may be also conveniently generated in ICE cylinders during vehicle braking, as for example, disclosed by Larson et al. in U.S. Pat. No. 6,922,997.

The term "intake air" used in this application should be give an broad interpretation so as to include presence of ICE fuel and ICE exhaust gases. Thus, intake air is essentially a mixture of nitrogen, oxygen, carbon dioxide, water vapor, and inert gases, and it may also include ICE fuel vapor, nitrogen oxides, and hydrocarbons. Such fuel vapor, nitrogen oxides, and hydrocarbons may become a part of the intake air as a result of exhaust gas recirculation in the ICE. In some embodiments of the invention the high pressure (i.e., compressed) air for operation of the turboexpander may be derived from the intake air, therefore, the composition of the compressed air may be essentially the same as that of the intake air.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A supercharged internal combustion engine system comprising:
   an internal combustion engine and a turboexpander;
   said internal combustion engine having at least one combustion chamber and an intake passage;
   said intake passage being fluidly coupled to said combustion chamber and configured for flowing intake air thereinto;
   said intake passage being fluidly coupled to a source of intake air;
   said turboexpander having a turboexpander inlet port fluidly coupled to a source of high-pressure air;
   said turboexpander having a turboexpander outlet port fluidly coupled to said intake passage; and
   said turboexpander is solely driven by said high-pressure air.

2. The supercharged internal combustion engine system as in claim 1, wherein said source of high-pressure air is arranged to provide high-pressure air at near ambient temperature.

3. The supercharged internal combustion engine system as in claim 1, wherein said source of high-pressure air comprises an air tank.

4. The supercharged internal combustion engine system as in claim 1 further comprising a turbine wheel in said turboexpander; and said turbine wheel arranged to drive a brake.

5. The supercharged internal combustion engine system as in claim 1 further comprising a regulating valve configured for regulating the flow of intake air from said intake air source to said intake passage.

6. The supercharged internal combustion engine system as in claim 1 wherein said regulating valve is arranged to be closed when the mass flow rate of said high-pressure air through said inlet port is more than a first predetermined mass flow rate value and to be open when the mass flow rate of said high-pressure air through said inlet port is less than a second predetermined mass flow rate value.

7. The supercharged internal combustion engine system as in claim 6 wherein at least one of the closing speed and the opening speed of said regulating valve is controlled to produce substantially smooth variation in air density in said intake passage.

8. The supercharged internal combustion engine system as in claim 1, further comprising a turbocompressor having a turbocompressor inlet and a turbocompressor outlet; said turbocompressor inlet fluidly coupled to said source of intake air; said turbocompressor outlet fluidly coupled to said intake passage; and said turbocompressor being driven by said turboexpander.

9. The supercharged internal combustion engine system as in claim 8, said turbocompressor further comprising a compressor wheel; said turboexpander further comprising a turbine wheel; said compressor wheel and said turbine wheel being arranged on a common shaft.

10. A supercharged internal combustion engine system comprising:
    an internal combustion engine (ICE), a source of high-pressure air, and a supercharger;
    said internal combustion engine having at least one combustion chamber and an intake passage;
    said intake passage being fluidly coupled to said combustion chamber and configured for flowing intake air thereinto;
    said supercharger comprising a turboexpander and a turbocompressor;
    said turboexpander having a turboexpander inlet fluidly coupled to said source of high-pressure air;
    said turboexpander having a turboexpander outlet fluidly coupled to said intake passage;
    said turbocompressor having a turbocompressor inlet and a turbocompressor outlet;
    said turbocompressor inlet being fluidly coupled to said source of intake air;
    said turbocompressor outlet being fluidly coupled to said intake passage;
    said turboexpander being driven by high-pressure air from said high-pressure air source; and
    said turbocompressor being driven by said turboexpander.

11. The supercharged internal combustion engine system as in claim 10 further comprising a flow control means for regulating the mass flow rate of said high-pressure air through said turboexpander inlet port.

12. The supercharged internal combustion engine system as in claim 11 further comprising an electronic control unit (ECU) operatively coupled to said flow control means for regulating mass flow of said high-pressure air to said turboexpander inlet according to operating conditions of said ICE.

13. The supercharged internal combustion engine system as in claim 12, wherein said ECU is configured to increase said mass flow rate when ICE rotational speed is less than a predetermined ICE rotational speed value and ICE output torque is more than a predetermined ICE output torque value.

14. The supercharged internal combustion engine system as in claim 12, wherein said ECU is configured to decrease said mass flow rate when ICE rotational speed is more than a predetermined ICE rotational speed value and ICE output torque is less than a predetermined ICE output torque value.

15. The supercharged internal combustion engine system as in claim 1.2, wherein said ECU regulates said mass flow rate to said inlet port according to a combination of parameters chosen from the group consisting of ICE output shaft torque, ICE rotational speed, intake passage pressure, intake passage temperature, intake air flow rate, fuel flow rate, vehicle speed, and position of accelerator pedal.

16. The supercharged internal combustion engine system as in claim 11 further comprising an electronic control unit (ECU) operatively coupled to said flow control means; said ECU being configured to increase said mass flow rate when a first operating condition is met, and to decrease said mass flow rate when a second operating condition is met;
    said first operating condition is chosen from the group consisting of:
    1) engine rotational speed is less than a predetermined engine rotational speed value and engine output torque is more than a predetermined engine output torque value,
    2) engine rotational speed is less than a predetermined engine rotational speed value and engine fuel flow is more than a predetermined fuel flow value, and
    3) the difference between the demand torque value and engine output torque value is more than a predetermined torque difference value,
    4) the difference between the demand power value and engine output power value is more than a predetermined power difference value, and
    5) the difference between the supercharger output air density value required to meet demanded power and the measured supercharger output air density value is more than a predetermined density difference value;
    said second operating condition is chosen from the group consisting of:
    6) engine rotational speed is more than a predetermined engine rotational speed value and engine output torque is less than a predetermined engine output torque value,
    7) engine rotational speed is more than a predetermined engine rotational speed value and engine fuel flow is less than a predetermined fuel flow value, 8) the difference between the engine output torque value and demand torque value is less more a predetermined torque difference value,
9) the difference between the engine output power value and demand power value is more than a predetermined power difference value, and
10) the difference between the measured supercharger output air density value and the supercharger output air density value required to meet demanded power is more than a predetermined density difference value.

17. The supercharged internal combustion engine system as in claim 10 further including a nozzle fluidly coupled to said turboexpander outlet; said nozzle arranged to flow air from said turboexpander to said intake passage.

18. An internal combustion engine system comprising:
an internal combustion engine and a supercharger assembly;
said supercharger comprising a turbine and a compressor, which are being arranged on a common shaft;
said turbine being driven by high-pressure air;
said compressor being configured for compressing intake air and for delivering compressed intake air through an intake duct to said internal combustion engine;
said turbine exhausting air into said intake duct.

19. The supercharged internal combustion engine system as in claim 18 further comprising a bypass duct and a bypass valve; said bypass duct having a duct inlet fluidly coupled to said turbocompressor inlet; said bypass duct having a duct outlet fluidly coupled to said turbocompressor outlet; and said bypass valve configured for controlling the air flow through said bypass duct.

20. The supercharged internal combustion engine system as in claim 19 wherein said bypass valve is arranged to be closed when mass flow rate of said high-pressure air supplied to said turbine is more than a predetermined mass flow rate value and to be open when mass flow rate of said high-pressure air supplied to said turbine is less than a predetermined mass flow rate value.

21. The supercharged internal combustion engine system as in claim 19 wherein said bypass valve is arranged to be closed when the difference between the air pressure at said duct outlet and the air pressure at said duct inlet is more than a predetermined pressure value, and to be open when the difference between the air pressure at said duct outlet and the air pressure at said duct inlet is less than a predetermined pressure value.

22. A method for supercharging an internal combustion engine comprising the steps of:
providing an internal combustion engine (ICE) having a combustion chamber;
providing a turboexpander having a turbine wheel, a turboexpander inlet port, and a turboexpander outlet port;
providing an intake air supply;
providing a high-pressure air supply;
operating said ICE;
flowing intake air from said intake air supply to said combustion chamber;
feeding high-pressure air from said high-pressure air supply into said turboexpander inlet port;
spinning said turbine wheel;
expanding said high-pressure air in said turbine wheel;
removing energy from said high-pressure air;
flowing expanded air from said turboexpander outlet port;
mixing said expanded air with said intake air; and
flowing resulting mixed air into said combustion chamber.

23. The method of claim 22 further comprising the steps of:
providing a compressor operated by said turboexpander; and
compressing said intake air prior to mixing it with said expanded air.

24. The method of claim 22 further comprising the steps of:
providing a compressor having a compressor wheel arranged on a common shaft with said turbine wheel;
spinning said compressor wheel; and
compressing said intake air prior to mixing it with said expanded air.

25. The method of claim 22 further comprising the steps of:
sensing ICE power demand; and
varying the flow of said high-pressure air fed to said turboexpander inlet port in accordance with ICE power demand.

26. The method of claim 22 further comprising the steps of:
determining ICE output power demand;
determining flow rate of high-pressure air for feeding into said inlet port of said turboexpander;
feeding high-pressure air from said high-pressure air source at a predetermined flow rate into said inlet port.

27. The method of claim 26, wherein said step of determining ICE power demand further comprises sensing at least one ICE operating parameter chosen from the group consisting an ICE output shaft torque, ICE output power, engine rotational speed, intake port pressure, combustion chamber pressure, fuel flow rate, position of accelerator pedal, and speed of an associated motor vehicle.

28. A vehicle operated by an internal combustion engine comprising:
a vehicle, an internal combustion engine, a turboexpander, a compressed air tank, and a compressor;
said vehicle having a vehicle drive shaft configured for transmitting power from said engine to vehicle wheels;
said internal combustion engine having at least one combustion chamber, an intake passage, and an output shaft;
said intake passage being fluidly coupled to said combustion chamber and configured for flowing intake air thereinto;
said intake passage being fluidly coupled to a source of intake air;
said turboexpander having a turboexpander inlet port fluidly coupled to said air tank;
said turboexpander having a turboexpander outlet port fluidly coupled to said intake passage;
said compressor configured for compressing ambient air and feeding it to said air tank;
said compressor being operated by a source of power selected from the group consisting of said output shaft and said vehicle drive shaft.

29. The vehicle operated by an internal combustion engine as in claim 28 further comprising a variable speed drive for transmitting power from said source of power to said compressor.

30. The vehicle operated by an internal combustion engine as in claim 29; said variable speed drive arranged to maintain substantially constant speed of said compressor when said vehicle is decelerating.

31. The vehicle operated by an internal combustion engine as in claim 28 further comprising a turbocompressor having a turbocompressor inlet and a turbocompressor outlet; said turbocompressor inlet fluidly coupled to said source of intake air; said turbocompressor outlet fluidly coupled to said intake passage; and said turbocompressor being driven by said turboexpander.

\* \* \* \* \*